United States Patent
Lin et al.

(10) Patent No.: US 8,346,562 B2
(45) Date of Patent: Jan. 1, 2013

(54) METHOD AND APPARATUS FOR VOICE CONTROLLED OPERATION OF A MEDIA PLAYER

(75) Inventors: Gaile Lin, Shenzhen (CN); Yulong Chen, Shenzhen (CN); Hong Guan, Shenzhen (CN); Jing Wei Wang, Haikou (CN)

(73) Assignee: CSR Technology Inc., San Jose, CA (US)

( * ) Notice: Subject to any disclaimer, the term of this patent is extended or adjusted under 35 U.S.C. 154(b) by 561 days.

(21) Appl. No.: 12/668,238

(22) PCT Filed: Jan. 6, 2010

(86) PCT No.: PCT/CN2010/070031
§ 371 (c)(1),
(2), (4) Date: Jan. 8, 2010

(87) PCT Pub. No.: WO2011/082521
PCT Pub. Date: Jul. 14, 2011

(65) Prior Publication Data
US 2012/0191461 A1    Jul. 26, 2012

(51) Int. Cl.
*G10L 21/00*    (2006.01)
(52) U.S. Cl. ...................................... 704/275
(58) Field of Classification Search .................. 704/275; 381/150
See application file for complete search history.

(56) References Cited

U.S. PATENT DOCUMENTS

| 5,704,009 A * | 12/1997 | Cline et al. ..................... 704/275 |
| 5,737,491 A * | 4/1998 | Allen et al. ..................... 704/270 |
| 6,415,258 B1 * | 7/2002 | Reynar et al. ................. 704/275 |
| 7,324,947 B2 * | 1/2008 | Jordan et al. ................... 704/275 |
| 2006/0004743 A1 * | 1/2006 | Murao et al. ..................... 707/4 |
| 2009/0222270 A2 * | 9/2009 | Likens et al. ................. 704/275 |

FOREIGN PATENT DOCUMENTS

| CN | 2328145 Y | 7/1999 |
| CN | 2751405 Y | 1/2006 |
| JP | 2000267837 A | 9/2000 |

OTHER PUBLICATIONS

International Search Report and Written Opinion, PCT/CN2010/070031, issued Oct. 21, 2010.

* cited by examiner

*Primary Examiner* — David R Hudspeth
*Assistant Examiner* — Shaun Roberts
(74) *Attorney, Agent, or Firm* — RatnerPRestia

(57) ABSTRACT

A system and methods for voice controlled operation of a media player are provided. In one embodiment, a method includes detecting user positioning of a microphone power switch to an off position, detecting user positioning of the microphone power switch to an on position within a predetermined period of time and entering a voice recognition mode, by the media player, based on the user positioning of the microphone power switch to the on position within the predetermined period of time. The method may further include detecting one or more output signals of the microphone, detecting a voice command based on the one or more output signals of the microphone, and controlling operation of the media player based on the voice command, wherein the media player outputs a graphical display associated with the voice command.

21 Claims, 6 Drawing Sheets

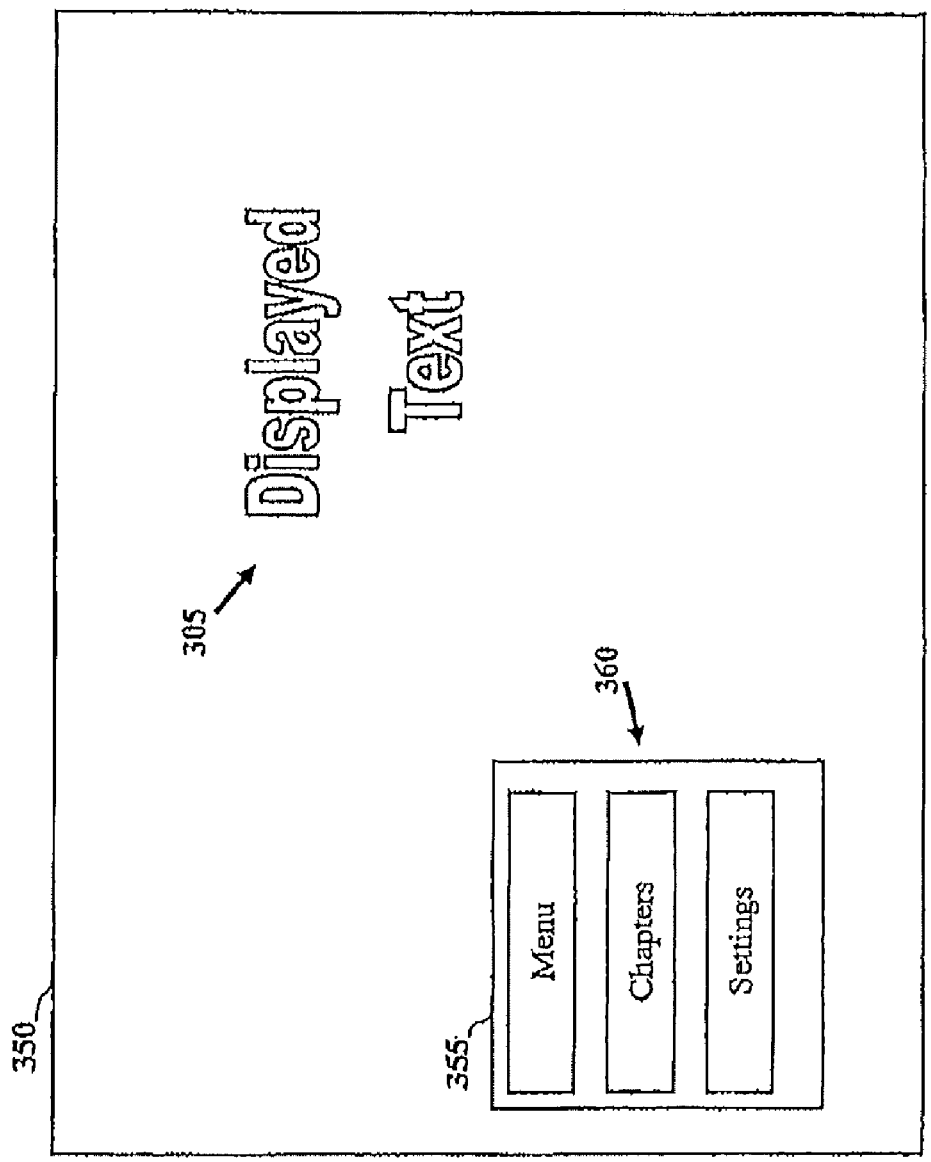

METHOD AND APPARATUS FOR VOICE CONTROLLED OPERATION OF A MEDIA PLAYER

CROSS REFERENCE TO RELATED APPLICATION

This application claims priority to International Application No. PCT/CN2010/070031 filed Jan. 6, 2010.

FIELD OF THE INVENTION

The present invention relates in general to voice controlled operation of a media device and more particularly to voice control of a media player.

BACKGROUND OF THE INVENTION

Conventional methods and systems for control of digital audio devices typically require user activation of media player terminals or operation of a remote control. For some applications which employ digital audio devices, such as karaoke systems and interactive entertainment systems, the conventional methods and systems do not allow for user control of the digital audio player based on voice commands. For interactive entertainment systems and media player applications, such as karaoke, it is an inconvenience for a many users to operate media player terminals and/or use a remote control. For example, a user may not have access to control buttons of the media player. Similarly, use of a remote control may not benefit media player applications, such as karaoke, as it can decrease a user's experience.

Accordingly, there is a need in the art for a system and method which allows for voice control of a media player and addresses one or more of the aforementioned drawbacks.

BRIEF SUMMARY OF THE INVENTION

Disclosed and claimed herein, are systems and methods for voice controlled operation of a media player. In one embodiment, a method includes detecting user positioning of a microphone power switch to an off position, detecting user positioning of the microphone power switch to an on position within a predetermined period of time and entering a voice recognition mode, by the media player, based on the user positioning of the microphone power switch to the on position within the predetermined period of time. The method further includes detecting one or more output signals of the microphone, detecting a voice command based on the one or more output signals of the microphone, and controlling operation of the media player based on the voice command, wherein the media player outputs a graphical display associated with the voice command.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 3A-3B depict graphical representations of display output according to one or more embodiments of the invention;

DETAILED DESCRIPTION OF THE EXEMPLARY EMBODIMENTS

One aspect of the present invention relates to voice control of a media player. In one embodiment, a method is provided for voice control of a media player based on user positioning of a microphone power button. Based on user positioning of the microphone power button, a media player can enter a voice recognition mode to detect one or more commands. By providing voice control of the media player using the microphone and detecting user positioning of the power button, control of the media player may be facilitated as the user can enter commands without using terminals of the media player.

As used herein, a media player relates to an audio/video device configured to output one or more of audio and/or video data, wherein audio data may include microphone output data. In one embodiment, a media player includes a disc reader configured to detect audio and/or video data stored on a disc (e.g., CD, DVD, Blu-ray™, etc.). Alternatively or in combination, a media player may be configured to output audio and video data stored as files and/or received from a network source. The media player may be used for karaoke, presentations, interactive entertainment, gaming, etc.

According to another embodiment, a system is provided which includes a media player which may be configured for voice control. In one embodiment, the system includes a microphone which may be used to provide audio signals for output by the media player and/or voice commands for the media player. In one embodiment, the system may be configured for wired connection to a microphone. Alternatively, the system may be configured for wireless microphone operation.

According to another embodiment, the system may relate to a karaoke system, wherein one or more voice commands by a user may control a media player. One advantage of the present invention over the conventional karaoke systems is to provide voice recognition based on user positioning of a power button of the microphone.

Description Of The Exemplary Embodiments

Figure 1:
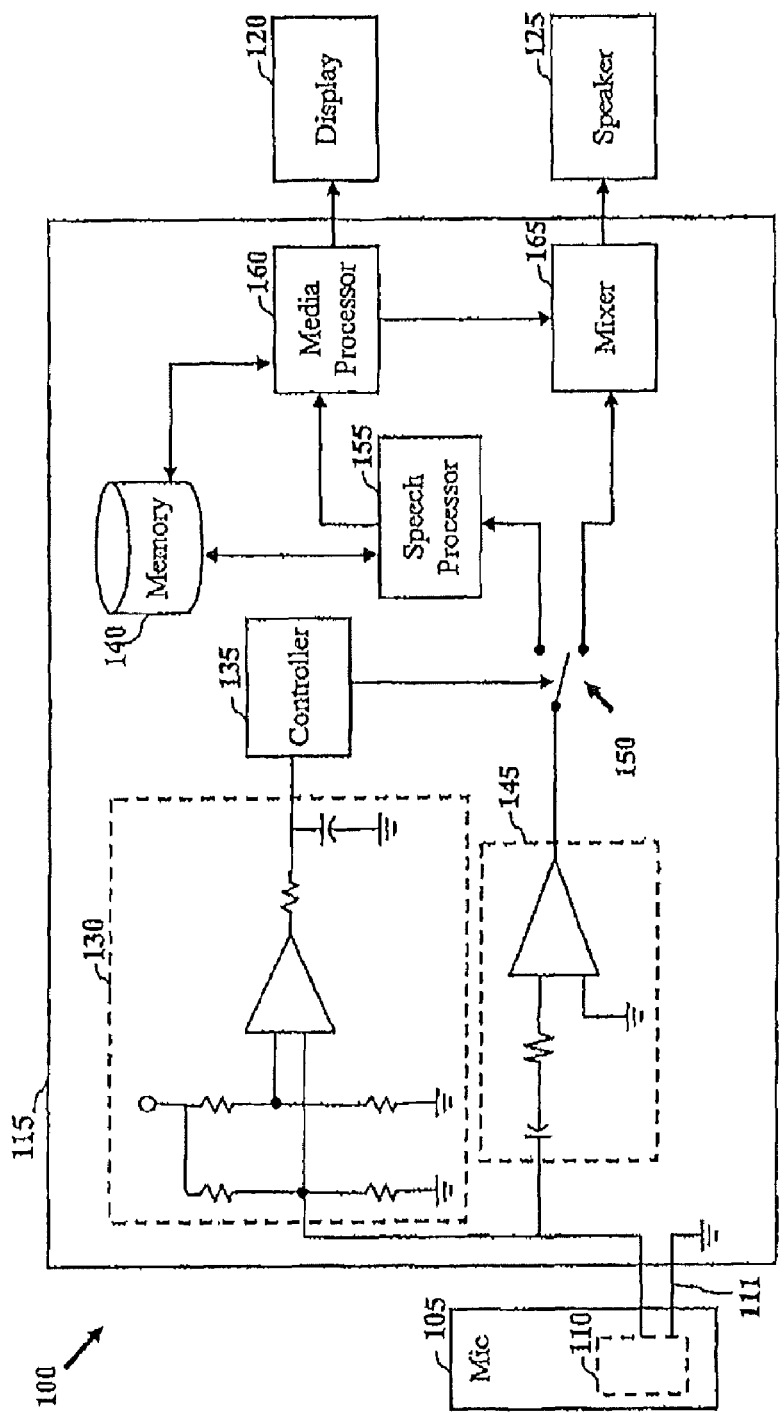
FIG. 1 depicts a simplified system diagram according to one or more embodiments of the invention.

Referring now to the figures, FIG. 1 depicts a simplified system diagram according to one or more embodiments of the invention. According to one embodiment, system 100 includes microphone 105 and media player 115. Media player 115 may be configured to output one or more of audio and video output to display 120 and speaker 125. System 100 relates media player based system for providing audio and/or video output. For example, system 100 may be employed for one or more of a karaoke system, public address system, media presentation system, gaming system, and interactive entertainment system in general.

As shown in FIG. 1, microphone 105 comprises switch 110. Switch 110 may relate to a power switch of microphone 105. As will be discussed in more detail below, a user may operate switch 110 to establish a voice detection mode. Switch 110 may relate to a push-button switch, slide switch, and switch in general. In certain embodiments, a separate switch (not shown in FIG. 1) may be employed to enter a voice detection mode. For example, microphone 105 may include a dedicated button in certain embodiments.

Microphone 105 may be coupled to media player 115 via cable 111. Media player 115 may be configured to amplify output signals provided by microphone 105 for output on speaker 125. Based on output of microphone 105 on cable 111, operation of media player 135 may be controlled.

Media player 115 may be configured to output one or more of audio and video data. For example, in one embodiment system 100 relates to a karaoke system. As such, media player 115 may be configured to amplify audio data provided by microphone 105 for output by speaker 125. One or more audio signals output by microphone 105 may be amplified by gain circuit 145. Media player 115 may additionally output audio and or video data based on media selected by a user. Audio and video data output by media player 115 may be based on media such as DVD, Blu-ray™ disk, etc. Alternatively or in combination, media may relate to one or more digital files stored by memory 140. As such, media processor 160 may output the particular media. In a further embodiment, media player 115 may be configured to output audio/video data received via a network connection of media player 115 (not shown in FIG. 1).

Media player 115 may additionally be configured to detect one or more voice commands in a voice detection mode. According to one embodiment, media player 115 may enter a voice detection mode based on user positioning of switch 110. For example, user positioning of the microphone switch 110 from an on position to an off position, followed by user positioning of switch from the off position to an on position within a predetermined time can trigger a voice detection mode of media player 115. Comparator circuit 130 of media player 115 may be configured to detect changes in output voltage of cable 111 based on user positioning of switch 110. Output of comparator circuit 130 is provided to controller 135 for control of switch circuit 150. Switch 150 may be employed to output voice commands to speech processor 155. By way of example, when a user toggles power switch 110 of microphone 105 to an on position, controller 135 may control switch circuit 150 to provide output of microphone 105 to mixer 165. Alternatively, user positioning of switch 110 can trigger controller 135 to control switch circuit 150 to provide microphone output signals to speech processor 155.

In the voice detection mode, speech processor 155 may determine one or more voice commands for control of media player 115 based on input received from gain circuit 145. For example, one or more voice phrases may be associated functions of the media player, such as playing, stopping, forwarding, reversing, pausing, and selecting media to be output by the media player. Similarly, one or more voice commands may relate to one or more of microphone volume adjustment, audio effects by the media player, and navigation of a displayed menu.

According to one embodiment, media player 115 may output one or more of an audible sound and/or graphical image to inform a user of a voice detection mode and/or a determined voice command. For example, when a voice command relates to selection of media, the media player may output a graphical display for one or more of a drop down menu, control menu and icon associated with the voice command. In that fashion, one or more functions of media player 115 may be accessed by a user.

Following determination of a voice command, controller 135 may control switch unit 150 to direct audio output microphone 105 to mixer 165. Mixer 165 may be configured to combine audio received from microphone 105 and audio data output from media processor 160. Media processor 160 may relate to one or more of a disc player and digital media player. Audio data may be output from mixer 165 to speaker 125. Similarly, media processor 160 may output video data including graphics and text to display 120. In certain embodiments, video output may be based on lyrics for karaoke and/or data stored in memory 140. Memory 140 relates to one of ROM and RAM memory. Executable instructions and/or data received by media player 115 may be stored by memory 140.

In certain embodiments, where media player 115 relates to a disc player (e.g., DVD, Blu-ray™), voice commands may relate to commands associated to media player commands for selection and control of media output. By way of example, Table 1 represents exemplary voice commands which may be selected by a user.

TABLE 1

| Index | Commands |
|-------|----------|
| 1 | Play |
| 2 | Stop |
| 3 | Pause |
| 4 | Next |
| 5 | Previous |
| 6 | Mute |
| 7 | Audio Channel Switch |
| 8 | Volume UP |
| 9 | Volume Down |

Although microphone 105 and media player 115 are depicted as separate elements, it may also be appreciated that these elements may be combined as a single unit in certain embodiments (not shown in FIG. 1). Further, the combined microphone and media player device may be configured to wirelessly transmit audio and/or video data to at least one of a base, display 120 and speaker 125 according to another embodiment.

According to another embodiment, microphone 105 may include an LED (not shown in FIG. 1) to provide a user indication that media player 115 is in a voice detection mode. For example, microphone may illuminate the LED to provide a user that the microphone is on, and flash to indicate a voice detection mode.

Although described as units of hardware in FIG. 1, it should be appreciated that the functions of the units may be implemented in a variety of ways including hardware, firmware, software, and combinations thereof.

Figure 2:
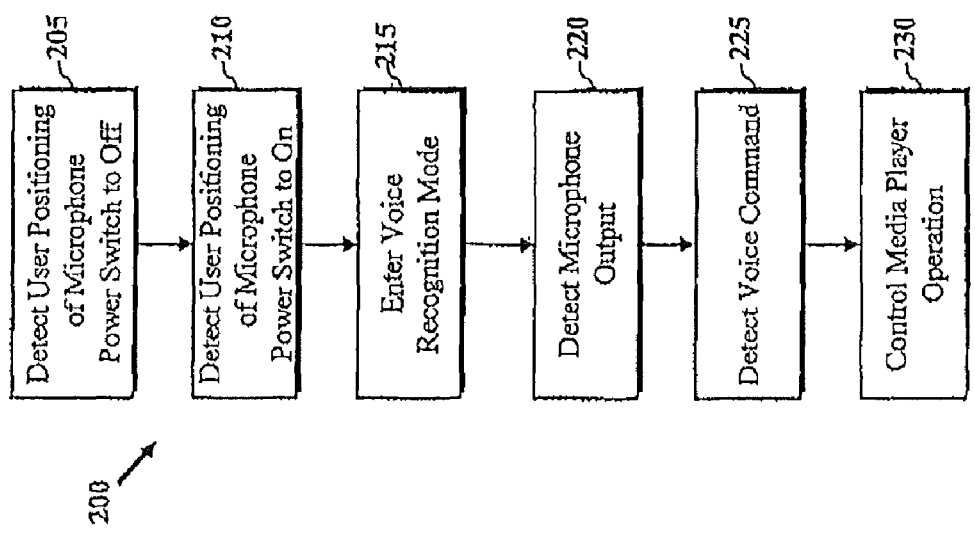
FIG. 2 depicts a process for operation of a media player according to one embodiment of the invention.

Referring now to FIG. 2 a process is depicted for voice controlled operation of a media player according to one embodiment of the invention. Process 200 may be performed by system of FIG. 1, according to one embodiment. Process 200 may be initiated by detection of user positioning of a microphone power switch to an off position at block 205. Process 200 may then detect user positioning of the microphone power switch to an on position at block 210. In one embodiment, a media player (e.g., media player 115) can detect user position of the on/off button of a microcontroller based on microphone output to a microphone cable or output of a microphone receiver. User positioning of the microphone power button may be based on comparison of microphone output signals to a threshold voltage. The media player may check that the user positioning of the microphone power switch is within a predetermined period of time to enter a voice detection mode. For example, the media player may check for user toggling of the power switch from on to off, and off to on within a period of three (3) seconds. However, it should be appreciated that other time periods may be employed.

At block 215, the media player can enter a voice recognition mode based on the user positioning of the microphone power switch to the on position within the predetermined period of time entering the voice recognition mode may include providing the one or more output signals of the microphone to a speech processor of the media player. The speech processor can detect one or more output signals of the microphone at block 220. Process 200 may additionally include output of audio and/or video notification by the media player to alert a user of the voice control mode. The voice recognition mode may be initiated by the media player for a period to allow a user to provide a voice command. For example, the voice recognition mode may sample audio data for a period of five (5) seconds. In another embodiment, the voice recognition mode may last anywhere between two (2) and ten (10) seconds and further may be defined by a user.

At block 225, a voice command may be detect by the speech processor based on the output signals of the microphone during the voice recognition mode. According to one embodiment, the one or more output signals of the microphone may be wireless transmitted to a receiver which may output the signals to the media player.

At block 230, operation of the media player may be controlled based on the voice command, wherein the media player outputs a graphical display associated with the voice command. The media player may then switch to a mode wherein one or more of audio, video and microphone output by the media player. In that fashion, voice controlled operation may be provided for karaoke, audio and video presentations, and interactive entertainment in general. According to another embodiment, the media player may be configured to one or more voice commands during a voice recognition mode.

Figure 3A:
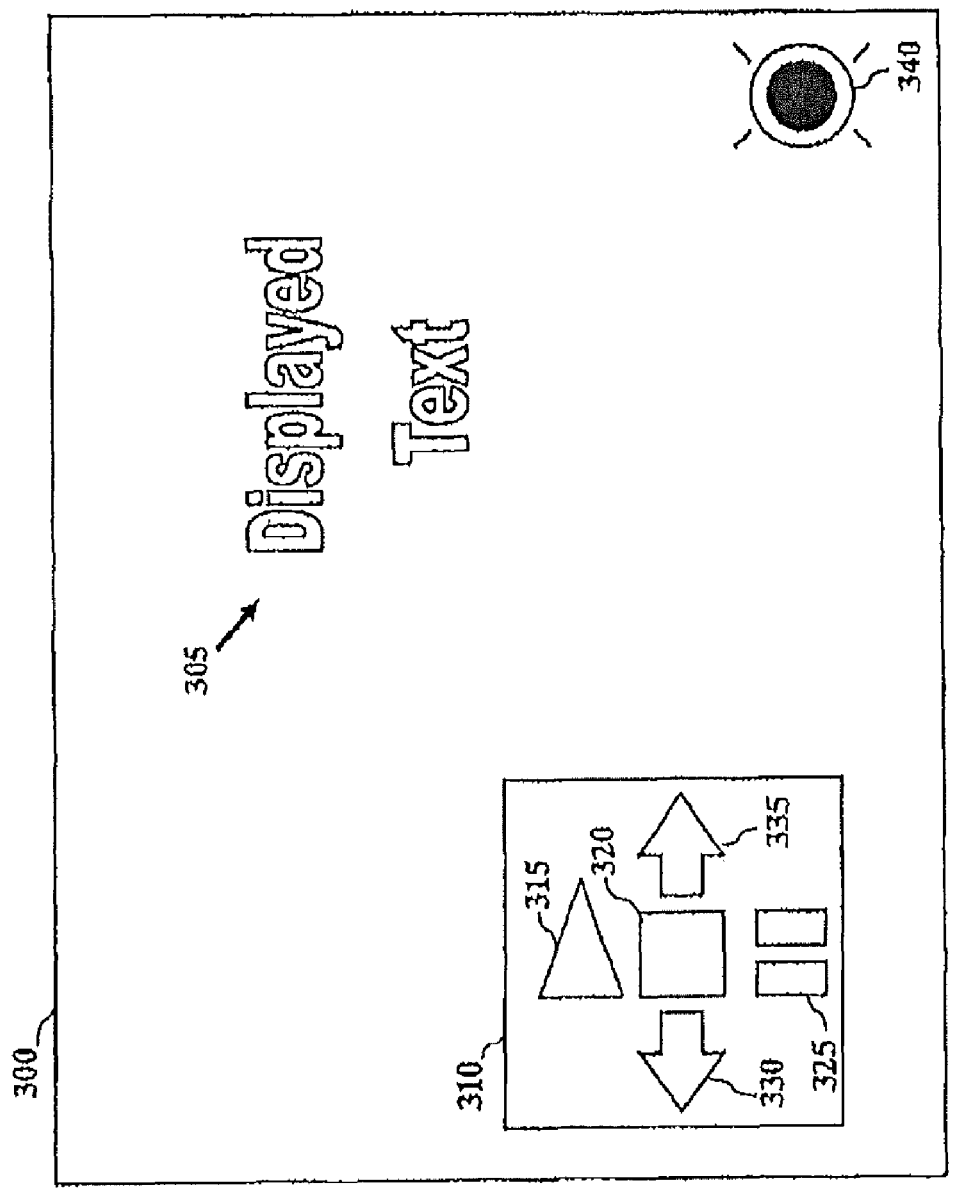

Referring now to FIGS. 3A-3B, graphical representations are depicted of exemplary video output by the media player of FIG. 1 according to one or more embodiments of the invention. Referring first to FIG. 3A, display window is shown of a display (e.g., display 120) of the system of FIG. 1. In certain embodiments, media player may output video images for karaoke, including lyrics associated with a particular track and/or video imagery. Display window 300 may include text, shown as 305, which may correspond to audio data (e.g., music) played.

According to one embodiment of the invention, the media player may output a navigation display 310 associated with a voice detection mode. For example, when a voice command is detected by the media player, the media player may output one or more displays such as navigation display 310. Navigation display 310 may be temporarily displayed based on user commands.

As depicted, navigation display 310 includes symbols for play 315, stop 320, pause 325, previous 330 and next 335. In one embodiment, the display of a particular symbol may be highlighted or altered based on a voice command detected. According to another embodiment, the media player may be configured to display a notification symbol during a voice detection mode. Symbol 340 may be displayed to notify a user of the voice detection mode and in certain embodiments may be displayed as a flashing symbol. Based on a user voice command, the media player may discontinue the display of symbol 340.

Referring now to FIG. 3B, a display window according to another embodiment. Based on one or more voice commands detected, the media player may be configured to display a drop down menu 355 in display window 350. Drop down menu 355 may provide one or more menu features of the display device for a user to select using voice commands and the microphone. According to one embodiment, drop down menu 355 may be employed by a user to access one of more audio and video features of a media disc (e.g., DVD, Blu-ray™ disc, etc.). As shown in FIG. 3B, drop down menu 355 may provide user interface to select a menu, chapters and/or settings of the media disc.

Figure 4:
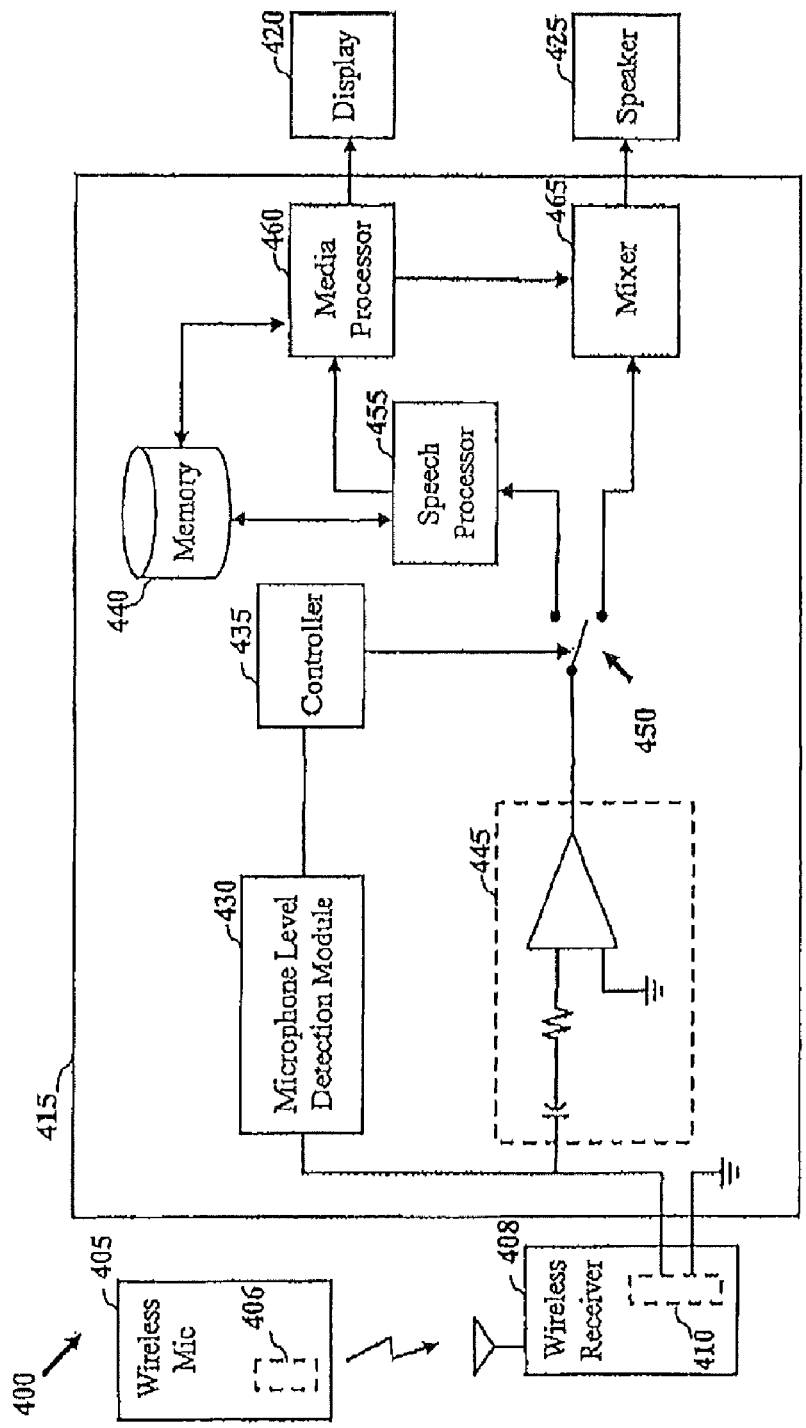
FIG. 4 depicts a simplified system diagram according to another embodiment of the invention.

Referring now to FIG. 4, a simplified system diagram is depicted according to another embodiment of the invention. System 400 relates to another embodiment of the system of FIG. 1, wherein a wireless microphone is employed. Wireless microphone 405 includes power button 406 which may be positioned by the user. According to one embodiment, wireless microphone 405 may be configured to transmit one or more wireless signals, including voice, to wireless receiver 408. Wireless microphone 405 may be configured to communicate with wireless receiver 408 based on one of a radio-frequency (RF) communication protocol and a short range wireless communication protocol (e.g., Bluetooth™). Based on the transmitted microphone signals received by wireless receiver 408, media player 415 may output graphical and/video data to display 420 and audio output to speaker 425.

Wireless receiver 408 may provide output signals received from wireless microphone 405 to media player 415 via terminals 410. According to one embodiment, wireless microphone may be configured to transmit audio data above a threshold voltage. Based on user positioning button 406 of wireless microphone 408 from an on position to an off position, output of the microphone may fall below the threshold value. Microphone level detection circuit 430 of media player may be configured to detect output of wireless receiver 408. As will be discussed in more detail below with respect to FIG. 5, microphone level detection circuit 430 to determine if the microphone output falls below the predetermined voltage threshold.

When output voltage of microphone 405 is below an input threshold, level detection module 430 may provide output to controller 435 for control of switch 450. As such, output of gain circuit 445 may be may be passed to speech processor 455 for detection of one or more voice commands during a voice detection mode. Alternatively, when output is above the threshold, controller 435 may control switch 450 to provide output to mixer 465. Speech processor 455 may be configured to provide one or more commands to media processor 460. In that fashion, wireless voice control of media player 415 is provided.

Figure 5:
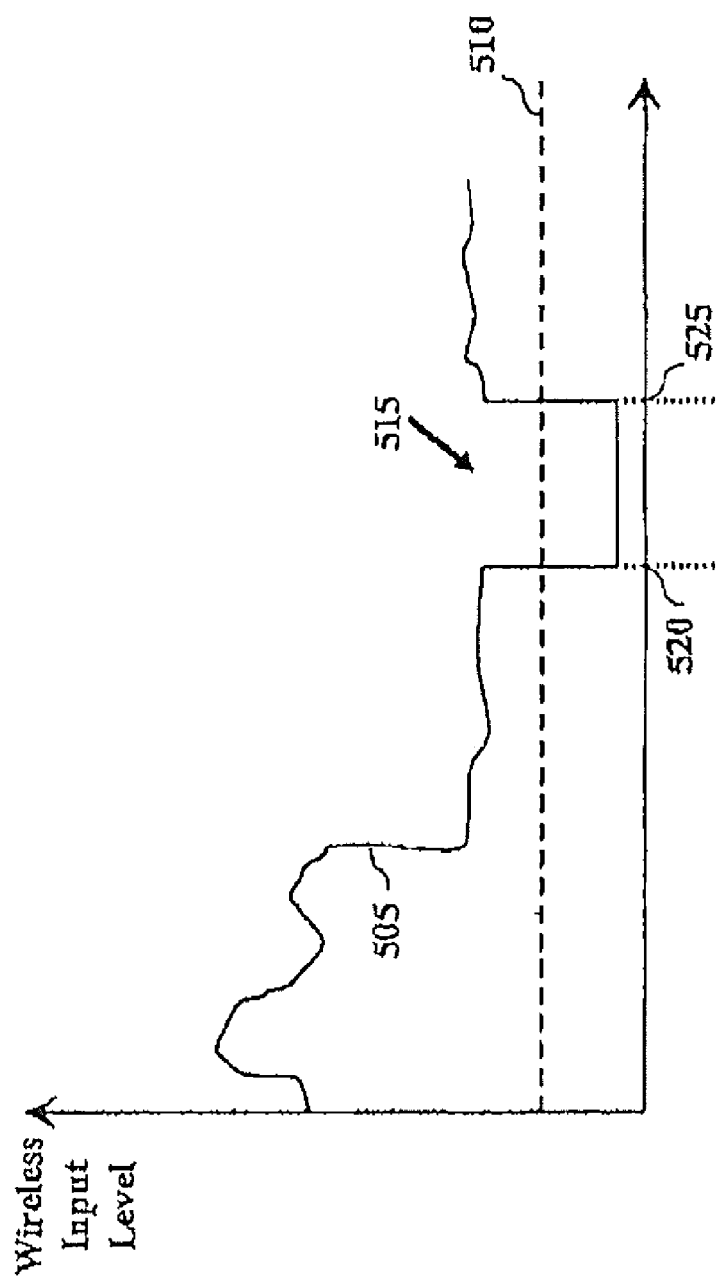
FIG. 5 depicts a graphical representation of wireless input signal according to one embodiment of the invention.

Referring now to FIG. 5, a graphical representation is depicted of a wireless input signal received by the media player (e.g., media player 415) of FIG. 4 according to one embodiment of the invention. Input signal 505 depicts an exemplary output signal of a wireless microphone. According to one embodiment, a level detection module (e.g., level detection module 430) may be configured to monitor the output signal for periods which correspond to a user positioning of the microphone off, and then on, shown as 515. As such, the input signal will drop below microphone threshold 510. The media player may then determine a period that microphone output is below threshold 510, shown by start point 520 and end point 525. Start point 520 may relate to user positioning of the microphone power button to the off position while end point 525 relates to user positioning of the microphone to the on position. The media player may then determine whether a voice control mode has been entered following user positioning of the microphone power button to the on position at end point 525.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for voice controlled operation of a media player, the method comprising the acts of:
 detecting user positioning of a microphone power switch to an off position;
 detecting user positioning of the microphone power switch to an on position within a predetermined period of time;
 entering a voice recognition mode, by the media player, based on the user positioning of the microphone power switch to the on position within the predetermined period of time;
 detecting one or more output signals of the microphone;
 detecting a voice command based on the one or more output signals of the microphone; and
 controlling operation of the media player based on the voice command, wherein the media player outputs a graphical display associated with the voice command.

2. The method of claim 1, wherein detecting user positioning of the microphone power switch is based on a comparison of microphone output signals to a threshold voltage.

3. The method of claim 1, wherein entering the voice recognition mode comprises providing the one or more output signals of the microphone to a speech processor.

4. The method of claim 1, wherein the voice command relates to a media player command for one of playing, stopping, forwarding, reversing, pausing, and track selection of media output by the media player.

5. The method of claim 1, wherein the voice command relates to one or more of microphone volume adjustment, selecting an audio effect of the media player, and navigation of a displayed menu.

6. The method of claim 1, wherein the graphical display relates to one or more of a drop down menu, control menu and symbol associated with the voice command.

7. The method of claim 1, further comprising controlling operation media player output of one or more of audio, video and microphone output signals.

8. The method of claim 1, wherein the predetermined period of time relates to three seconds.

9. The method of claim 1, wherein voice controlled operation relates to voice controlled operation for one or more of karaoke, audio and video presentations, and interactive entertainment systems in general.

10. The method of claim 1, wherein the one or more output signals of the microphone are wirelessly received.

11. A system comprising:
 a microphone having a power switch; and
 media player electrically coupled to the microphone, wherein the media player is configured to:
   detect user positioning of a microphone power switch to an off position;
   detect user positioning of the microphone power switch to an on position within a predetermined period of time;
   enter a voice recognition mode, by the media player, based on the user positioning of the microphone power switch to the on position within the predetermined period of time;
   detect one or more output signals of the microphone;
   detecting a voice command based on the one or more output signals of the microphone; and
   control operation of the media player based on the voice command, wherein the media player outputs a graphical display associated with the voice command.

12. The system of claim 11, wherein the media player is configured to detect user positioning of the microphone power switch based on a comparison of microphone output to a threshold voltage.

13. The system of claim 11, wherein the media player enters the voice recognition mode by providing the one or more output signals of the microphone to a speech processor.

14. The system of claim 11, wherein the voice command relates to media player commands for one or more of playing, stopping, forwarding, reversing, pausing, and selecting media output by the media player.

15. The system of claim 11, wherein the voice command relates to one or more of microphone volume adjustment, selecting audio effects provided by the media player, and navigation of a displayed menu.

16. The system of claim 11, wherein the graphical display relates to one or more of a drop down menu, control menu and symbol associated with the voice command.

17. The system of claim 11, wherein the media player is further configured to output one or more of audio, video and microphone output.

18. The system of claim 11, wherein the predetermined period of time relates to three seconds.

19. The system of claim 11, wherein voice controlled operation relates to voice controlled operation for one or more of karaoke, audio and video presentations, and interactive entertainment systems in general.

20. The system of claim 11, wherein the media player is further configured to received the one or more output signals of the microphone wirelessly.

21. The system of claim 11, wherein the media player is further configured to output at least one of audio and video data based on stored data, data detected from a data disc, and data received form a network source.

* * * * *